(12) United States Patent
Dietze et al.

(10) Patent No.: US 7,364,187 B2
(45) Date of Patent: Apr. 29, 2008

(54) VENTILATION DEVICE FOR A VEHICLE

(75) Inventors: Holger Dietze, Cremlingen (DE); Jörn Kessler, Langen (DE); Michael Steenbock, Hamburg (DE); Peter Dahmen, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 253 days.

(21) Appl. No.: 10/827,652

(22) Filed: Apr. 19, 2004

(65) Prior Publication Data
US 2004/0214517 A1 Oct. 28, 2004

Related U.S. Application Data

(63) Continuation of application No. PCT/EP02/09192, filed on Aug. 16, 2002.

(30) Foreign Application Priority Data

Oct. 17, 2001 (DE) ................. 101 50 660
Dec. 21, 2001 (DE) ................. 101 63 685

(51) Int. Cl.
*B60R 21/205* (2006.01)
*B60R 21/16* (2006.01)

(52) U.S. Cl. .................... 280/732; 280/728.2
(58) Field of Classification Search ........... 280/732, 280/728.2
See application file for complete search history.

(56) References Cited

U.S. PATENT DOCUMENTS 3,817,552 A 6/1974 Knight, IV et al.
3,922,429 A 11/1975 Welch et al.
5,087,067 A 2/1992 Seki et al.
5,209,519 A 5/1993 Shiga et al.
5,295,707 A * 3/1994 Satoh et al. ............. 280/728.2
5,295,708 A * 3/1994 Siga et al. ................. 280/732
5,342,082 A * 8/1994 Kriska et al. ............ 280/728.2

(Continued)

FOREIGN PATENT DOCUMENTS

DE  38 06 783 A1  9/1989

(Continued)

OTHER PUBLICATIONS

Hinch, J. et al.: "Air Bag Technology in Light Passenger Vehicles", NHTSA People Saving People, www.nrd.nhtsa.gov, Jun. 27, 2001.

*Primary Examiner*—Paul N. Dickson
*Assistant Examiner*—Joselynn Y. Sliteris (57) ABSTRACT

A ventilation device for a vehicle includes an instrument panel having a front passenger region with a front instrument panel wall region facing a windshield and a rear instrument panel wall region as a potential head-impact instrument panel wall region. An individual vent air-feeding duct, which is covered by the instrument panel, extends below the potential head-impact instrument panel wall region and extends there essentially in a direction of the transverse axis of the vehicle. A front passenger airbag module can therefore be positioned away from the potential head-impact region in a free space formed in front of the individual vent air-feeding duct. The front instrument panel wall region has, at least in some regions, air passage openings for a diffuse ventilation of the vehicle interior. Starting from the individual vent air-feeding duct, at least one branch duct is guided to a region below the air passage openings.

28 Claims, 8 Drawing Sheets

U.S. PATENT DOCUMENTS

| | | | |
|---|---|---|---|
| 5,505,484 A * | 4/1996 | Miles et al. | 280/728.2 |
| 5,524,923 A | 6/1996 | Henseler | |
| 5,533,747 A | 7/1996 | Rose | |
| 5,620,366 A | 4/1997 | Münzel et al. | |
| 5,709,601 A | 1/1998 | Heck | |
| 5,868,423 A | 2/1999 | Takimoto et al. | |
| 6,170,857 B1 | 1/2001 | Okada et al. | |
| 6,217,438 B1 | 4/2001 | Dausch | |
| 6,250,678 B1 | 6/2001 | Yoshinaka et al. | |
| 6,508,701 B1 * | 1/2003 | Foury et al. | 454/121 |
| 6,709,327 B2 * | 3/2004 | Elliot et al. | 454/121 |
| 6,749,656 B2 * | 6/2004 | Paumier et al. | 55/385.3 |
| 6,918,262 B2 * | 7/2005 | Kamiya et al. | 62/244 |

FOREIGN PATENT DOCUMENTS

| | | |
|---|---|---|
| DE | 44 18 583 C2 | 3/1995 |
| DE | 43 38 099 A1 | 5/1995 |
| DE | 195 08 983 C1 | 2/1996 |
| DE | 196 26 441 A1 | 1/1998 |
| DE | 197 20 384 C1 | 6/1998 |
| DE | 198 07 259 A1 | 8/1999 |
| DE | 198 51 545 A1 | 9/1999 |
| DE | 200 07 819 U1 | 8/2000 |
| EP | 0 456 531 A1 | 11/1991 |
| EP | 0 713 792 A1 | 5/1996 |
| EP | 0 919 421 A2 | 6/1999 |
| EP | 1 072 483 A2 | 1/2001 |
| FR | 2 799 413 A1 | 4/2001 |
| GB | 2 368 052 A | 4/2002 |
| JP | 455146 A * | 2/1992 |
| WO | 98/34806 | 8/1998 |
| WO | 01/07283 A1 | 2/2001 |

* cited by examiner

Prior Art

FIG. 11

VENTILATION DEVICE FOR A VEHICLE

CROSS-REFERENCE TO RELATED APPLICATION

This application is a continuation, under 35 U.S.C. § 120, of copending international application No. PCT/EP02/09192, filed Aug. 16, 2002, which designated the United States; this application also claims the priority, under 35 U.S.C. § 119, of German patent application No. 101 50 660.0, filed Oct. 17, 2001, and German patent application No. 101 63 685.7, filed Dec. 21, 2001; the prior applications are herewith incorporated by reference in their entirety.

BACKGROUND OF THE INVENTION

Field of the Invention

The invention relates to a ventilation device for a vehicle, in particular for a motor vehicle.

Figure 9:
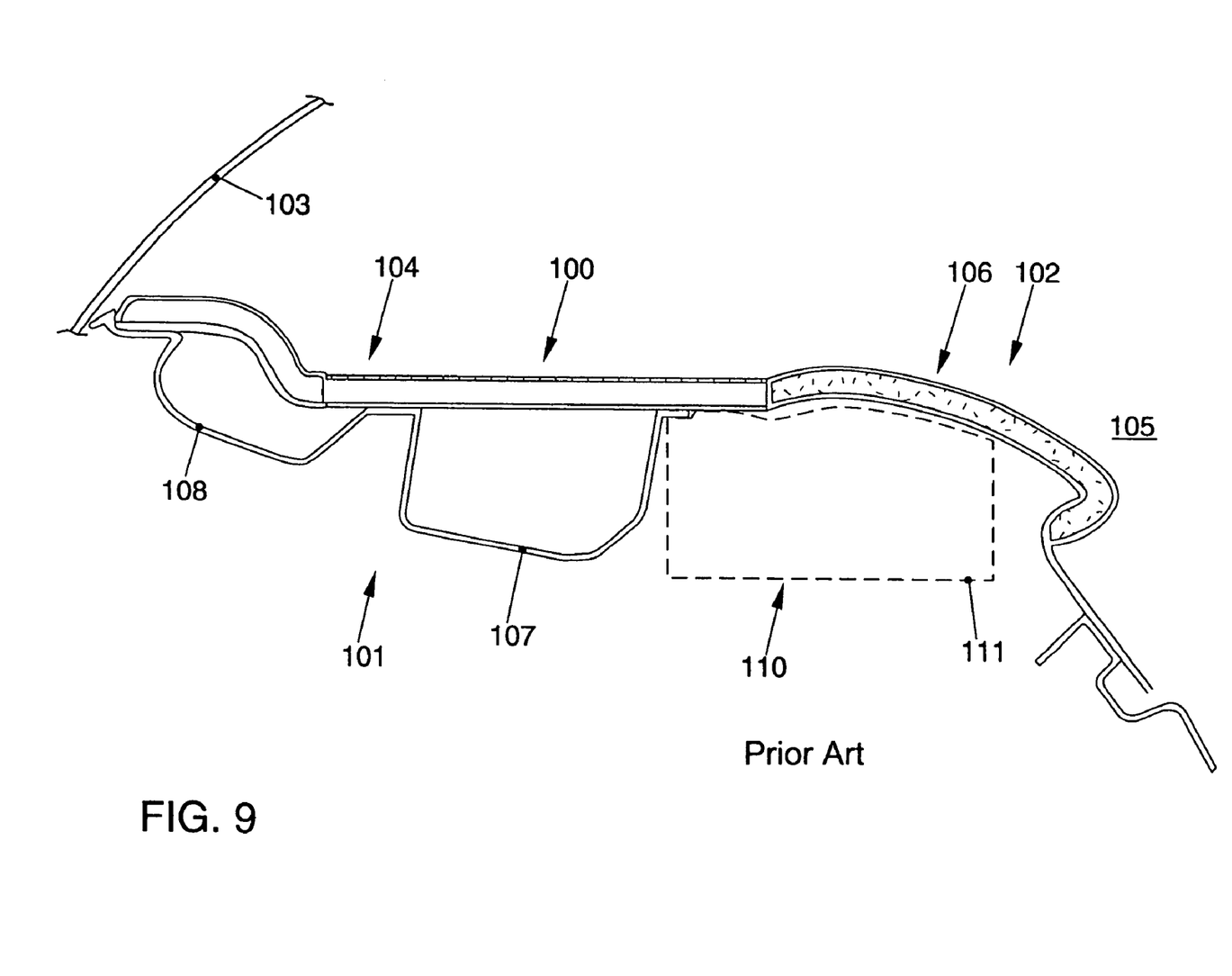
FIG. 9 is a diagrammatic, cross-sectional view of an instrument panel in a front passenger region according to the prior art.
Figure 10:
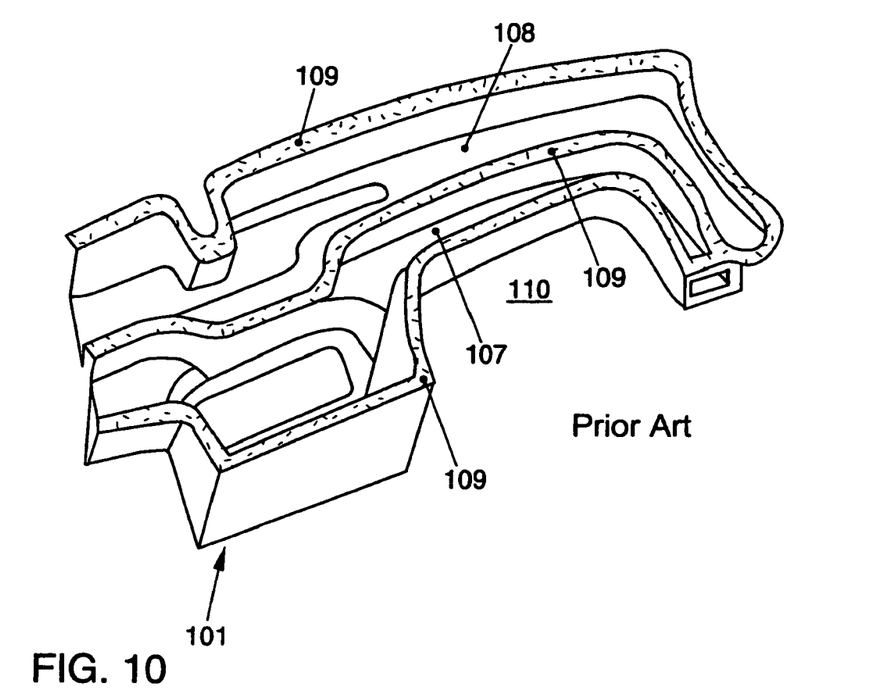
FIG. 10 is a diagrammatic, perspective view of an individual vent air-feeding duct which is combined with a defroster air duct in the front passenger region in accordance with the prior art.
Figure 11:
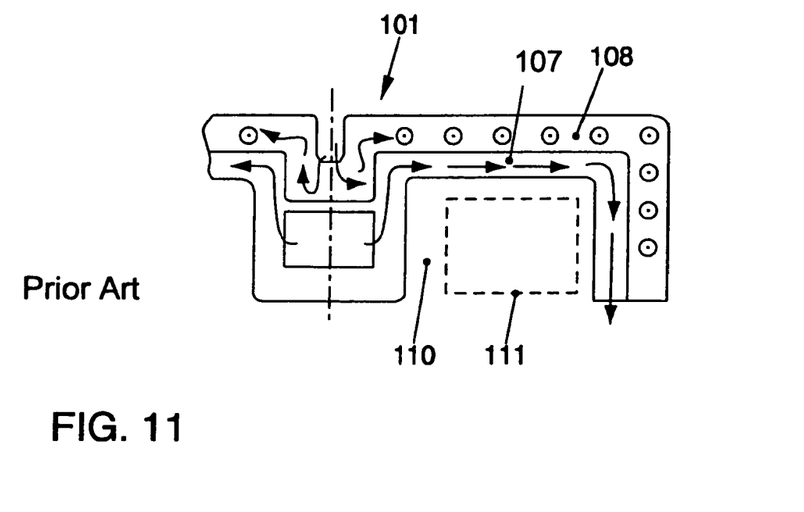
FIG. 11 is a diagrammatic plan view of the individual vent air-feeding duct with the combined defroster air duct as shown in FIG. 10 in accordance with the prior art.

A conventional ventilation device for a motor vehicle is illustrated schematically in FIGS. 9 to 11. FIG. 9 shows a cross section through an instrument panel 100 of the ventilation device 101 which has, in the front passenger region 102, a front instrument panel wall region 104, which is assigned to a windshield 103, and a rear instrument panel wall region 106, as a potential head-impact instrument panel wall region. The rear instrument panel wall region 106 adjoins the front instrument panel wall region 104 in a direction toward the vehicle interior 105 and away from the windshield 103 as seen in cross section through the instrument panel 100. The ventilation device 101 furthermore has an individual vent air-feeding duct 107, which is coupled to an air supply device, for feeding air to individual vent nozzles which are arranged in the instrument panel wall region and are likewise not illustrated here, the individual vent air-feeding duct being covered by the instrument panel 100.

As can furthermore be gathered from FIG. 9, a defroster air duct 108 is provided in front of the individual vent air-feeding duct 107, as seen in the direction of the longitudinal axis of the vehicle. The defroster air duct is coupled to a defroster air supply device which would normally be provided below the front instrument panel wall region 104 and would run essentially along the lower windshield edge region. Defroster nozzles, which are not illustrated here, are provided in the front instrument panel wall region 104 to feed the air from the defroster air duct to the windshield 103. It can be gathered in particular from FIG. 10 that the individual vent air-feeding duct 107 and the defroster air duct 108 are connected integrally to each other and are secured on a lower side of the instrument panel via planar welding connection surfaces 109. FIG. 11 shows a plan view of the individual vent air-feeding duct 107 and the defroster air duct 108.

As can furthermore be gathered from FIGS. 9 to 11, an airbag module 111, which is illustrated merely by dashed lines in FIG. 11 and which includes an airbag accommodated together with the associated gas generator in an airbag housing, is disposed below the potential head-impact instrument panel wall region 106 in a receiving space 110 in order to be able to inflate the airbag directly and rapidly in the front passenger region in front of the front passenger who is in a normal sitting position. Due to this configuration of the airbag in the rear instrument panel region 106, immediately after its activation, the airbag here is therefore inflated directly in the inflation region in front of the front passenger at a high filling pressure of, for example, approximately 30 bar. A construction of this type is problematic in particular in conjunction with vehicle occupants who are not in a normal sitting position (out-of-position), for example children standing directly behind the instrument panel in the front passenger region, or else children and adults who are situated, for example, in a posture with the head bent forward or inclined in the direction of the instrument panel and/or who are possibly not wearing their seat belts as required. In such a case, there is the risk that, in the event of an accident, the vehicle occupants will hit their head on this rear instrument panel region, which faces the front passenger, even before the airbag, as primary impact protection, is activated, or will at least move in the direction of this potential head-impact region, which, with an airbag activation taking place at the same time, results in a risk of injury for the vehicle occupants, because the airbag is inflated here, on the one hand, on account of the very high initial filling pressure, with a maximum airbag aggressiveness in the direction of the vehicle occupant or the region of the vehicle occupant's head, and, on the other hand, a head impact here is relatively hard, because, immediately after an impact of the vehicle occupant, the head-impact instrument wall region immediately forms a solid barrier on the airbag housing of the airbag module.

The individual vent air-feeding duct 107 is provided here in a U-shaped manner around the airbag module 111 in order to guide it to the individual vents which are provided in an edge region. This is awkward and may, under some circumstances, result in undesired losses in flow in terms of the power for discharging air. Secondly, this also requires a high outlay on material for the production of the individual vent air-feeding ducts.

U.S. Pat. No. 5,087,067 discloses a generic type of a ventilation device for a vehicle, in particular for a motor vehicle, having an instrument panel which, in the front passenger region, has a front instrument panel wall region, which is assigned to a windshield, and a rear instrument panel wall region, as the potential head-impact instrument panel wall region. The rear instrument panel region adjoins the front instrument panel wall region, as seen in cross section through the instrument panel, in a direction away from the windshield and toward the vehicle interior and is assigned to a front passenger. In addition, an individual vent air-feeding duct, which is coupled to an air supply device, for feeding air to individual vent nozzles arranged in the instrument panel wall region is provided, the individual vent air-feeding duct being covered by the instrument panel. An airbag module, which has at least one airbag and at least one gas generator which are accommodated in an airbag housing, is, in the fitted state, covered by the instrument panel. In this case, the individual vent air-feeding duct extends below the potential head-impact instrument panel wall region in the front passenger region and extends there essentially in the direction of the transverse axis of the vehicle. The airbag module is arranged in the front passenger region, as seen in the direction of the longitudinal axis of the vehicle, in a free space in front of the individual vent air-feeding duct and therefore assigned to the front instrument panel wall region essentially outside the potential head-impact instrument panel wall region. The effect therefore achieved by this construction of the instrument panel is that the airbag module is arranged outside the potential head-impact instrument panel wall region.

Furthermore, for example German Utility Model No. DE 200 07 819 U1, Published, Non-Prosecuted German Patent Application No. DE 198 07 259 A1, German Patent No. DE 195 08 983 C1, European Patent Application No. EP 0 713 792 A1, Published, Non-Prosecuted German Patent Application No. DE 43 38 099 A1, German Patent No. DE 44 18 583 C2 and German Patent No. DE 197 20 384 C1 disclose that the front instrument panel wall region can have a plurality of air passage openings, which form a certain perforation pattern, for providing a diffuse ventilation in a region of the vehicle interior. With such a configuration of the instrument panel wall region, the air outlet speed in the region of the air passage openings is considerably reduced compared with conventional discharge nozzles, so that a drafty ventilation, which is felt to be unpleasant by the vehicle occupants, due to high air discharge speeds does not occur. With a diffuse ventilation of this type, a pleasant room climate can therefore be created for the vehicle occupants by gently supplying the vehicle interior with fresh air. In addition, with a diffuse ventilation of this type, the noise level in the vehicle interior can be considerably reduced, since the air no longer flows here into the vehicle interior at a high speed which causes the high noise level, as is the case with conventional discharge nozzles. At the same time, with such a diffuse ventilation of the upper side region of an instrument panel, the radiation of heat by the instrument panel as a consequence of insolation can also be simultaneously considerably reduced.

SUMMARY OF THE INVENTION

It is accordingly an object of the invention to provide a ventilation device for a vehicle, in particular for a motor vehicle, which is of a simple construction and which allows, with a simple operation, an optimized feeding of air in the vehicle interior.

With the foregoing and other objects in view there is provided, in accordance with the invention, a ventilation device, including:

an instrument panel having a front passenger region with a front instrument-panel wall region and a rear instrument-panel wall region, the front instrument-panel wall region being assigned to the windshield, the rear instrument-panel wall region, when viewed in cross section through the instrument panel, adjoining the front instrument panel wall region in a direction away from the windshield and toward a vehicle interior, the rear instrument-panel wall region serving as a potential head-impact instrument panel wall region for a front passenger;

an individual vent nozzle provided at the instrument panel;

an individual vent air-feeding duct for feeding air to the individual vent nozzle, the individual vent air-feeding duct being covered by the instrument panel;

an air supply device coupled to the individual vent air-feeding duct;

an airbag module including an airbag housing, an airbag and a gas generator, the airbag and the gas generator being accommodated in the airbag housing, the airbag module, when in a mounted state, being covered by the instrument panel;

the individual vent air-feeding duct extending below the potential head-impact instrument panel wall region substantially in a direction of a transverse axis of the vehicle;

the front passenger region being configured such that a free space is provided in front of the individual vent air-feeding duct when viewed along a longitudinal axis of the vehicle, the airbag module being disposed in the free space in front of the individual vent air-feeding duct such that the airbag module is assigned to the front instrument panel wall region and is substantially outside the potential head-impact instrument panel wall region;

the front instrument-panel wall region facing the windshield having a region with air passage openings formed therein for a diffuse ventilation of the vehicle interior; and a branch duct extending from the individual vent air-feeding duct to a region below the air passage openings.

In other words, according to the invention, there is provided, a ventilation device for a vehicle, in particular for a motor vehicle, having an instrument panel which, in the front passenger region, has a front instrument panel wall region assigned to a windshield and a rear instrument panel wall region, as potential head-impact instrument panel wall region, which region, as seen in cross section through the instrument panel, adjoins the front instrument panel wall region away from the windshield in the direction of the vehicle interior and is assigned to a front passenger, having an individual vent air-feeding duct, which is coupled to an air supply device, for feeding air to individual vent nozzles arranged in the instrument panel wall region, the individual vent air-feeding duct being covered by the instrument panel, having an airbag module which has at least one airbag and at least one gas generator which are accommodated in an airbag housing, the airbag module, in the fitted state, being covered by the instrument panel, the individual vent air-feeding duct running below the potential head-impact instrument panel wall region in the front passenger region and extending there essentially in the direction of the transverse axis of the vehicle, and the airbag module being disposed in the front passenger region, as seen in the direction of the longitudinal axis of the vehicle, in a free space in front of the individual vent air-feeding duct and therefore being assigned to the front instrument panel wall region essentially outside the potential head-impact instrument panel wall region, wherein the front instrument panel wall region which faces the windshield has, at least in some regions, air passage openings for the diffuse ventilation of the vehicle interior, and wherein, starting from the individual vent air-feeding duct, at least one branch duct is guided into the region below the air passage openings.

The individual vent air-feeding duct can therefore advantageously be used for feeding air to the individual vent nozzles arranged in the instrument panel wall region and also, in a dual function, for simply and functionally reliably feeding air through the use of the at least one branch duct, which extends from the individual vent air-feeding duct, to the air passage openings arranged at least in some regions in the front instrument panel wall region, to provide a diffuse ventilation of the vehicle interior. This provides a simple construction of the ventilation device, since a separate duct routing with, if appropriate, an extra control panel for feeding air to the air passage openings is not necessary. As seen overall, a compact, material-saving construction of the ventilation device is therefore possible and can be produced relatively cost-effectively.

In addition, in the case of this air duct concept, in which the individual vent air-feeding duct runs in the region below the potential head-impact instrument panel wall region, components which are hard on impact, for example in particular an airbag module which has at least one airbag and at least one gas generator which are accommodated in an airbag housing, can furthermore advantageously be arranged in the front passenger region in a free space in front of the individual vent air-feeding duct, as seen in the direction of the longitudinal axis of the vehicle, and therefore essentially outside the potential head-impact instrument panel wall region. In particular in conjunction with a construction, in which the rear instrument panel wall region, as the potential head-impact instrument panel wall region, is produced at least in some regions from an energy-absorbing material, a relatively large amount of impact energy can already be absorbed in the event of a head impact onto this region, which results in a considerable reduction in the risk of injury for the vehicle occupant. This is the case in particular if the potential head-impact region is produced from a material which can be deformed with energy being absorbed, and the free space obtained below the potential head-impact region of the instrument panel is configured as a deformation space, so that, if a head impacts against the potential head-impact region, this region of the instrument panel can be deformed unimpeded into the deformation space with energy being absorbed. With a construction of this type, a particularly large amount of impact energy can be absorbed. Since the individual vent air-feeding duct arranged in the rear instrument panel region is not a load-bearing and stiff component, a possibly required deformation of the potential head-impact region of the instrument panel into the free space as the deformation space is not substantially impaired, since the individual vent air-feeding duct can readily undertake this deformation movement.

In this case, the potential head-impact instrument panel wall region is particularly preferably produced essentially from a backing layer of energy-absorbing foam material preferably covered with a slush skin. A construction of this type can also be realized relatively favorably with high effectiveness.

A further advantage of this novel air duct concept is that it results in the shortest connecting paths of the air duct to the individual vent nozzles, which are generally arranged in the rear instrument panel region facing the vehicle occupant. This is particularly the case if the individual vent air-feeding duct is coupled in a central instrument panel region, as seen in the direction of the transverse axis of the vehicle, to the air supply device and is guided from there approximately rectilinearly in the direction of the transverse axis of the vehicle to at least one individual vent nozzle on the edge. This also allows to reduce possible flow losses. In addition, the straight configuration of the individual vent air-feeding duct also saves material, in contrast with the U-shaped construction of the generic prior art. This is particularly advantageous in respect of the cost of the material in particular in the context of series manufacturing.

The individual vent air-feeding duct may be configured integrally with the lower side of the instrument panel or else may also be secured on the lower side of the instrument panel in an essentially air-tight manner by a screw and/or clip and/or welding connection.

A particularly advantageous and material-saving construction is produced if a lower side wall region of the instrument panel is part of the air-feeding duct wall.

According to a particularly preferred, further refinement of the invention, the at least one branch duct starting from the individual vent air-feeding duct can be guided into the region of the air passage openings in the front instrument panel wall region in such a manner that it, as seen from above, does not cover an airbag module arranged in the free space in front of the individual vent air-feeding duct. This means that the inflating airbag cannot be obstructed by the branch duct or branch ducts. This contributes to ensuring the functional reliability of the configuration.

Furthermore, at least one discharge nozzle can be integrated in a load-bearing basic body of the front instrument panel wall region and is then advantageously connected directly to the at least one branch duct. As a result, a very good possibility of providing diffuse ventilation can therefore be realized overall in a very simple manner.

The basic body is preferably covered here from above by a covering which is continuously perforated with a perforation pattern in such a manner that a diffuse ventilation can be set in the region of the at least one discharge nozzle via the perforations as air passage openings. Particularly advantageously, an airbag outlet opening can be formed in such a covering which has perforations. For example, at least one subregion of the perforations can be provided in conjunction with the basic body situated beneath it wherein at least one material weakening and/or predetermined breaking point is provided in such a manner that the airbag outlet opening can be formed in it. The, for example, material weakenings can be covered in an excellent manner in conjunction with a perforated covering of this type, if this is desired. In addition, the covering can then act in a dual function both as a covering of the basic body in order to form a device for the diffuse ventilation and also as a covering flap for an airbag outlet opening. Particularly preferred here is a construction, in which a cutout is provided in the region of an instrument-panel-side airbag outlet region in the basic body and in which the perforated covering is provided with corresponding predetermined breaking points in this region in order to form at least one covering flap, which can be pivoted up, and covers the cutout from above. A covering flap of this type can be pressed open and overpowered by force in a particularly simple manner with little contact pressure force, so that the initial filling pressure can already be reduced considerably as a result. This likewise allows to overall considerably reduce the aggressiveness of the airbag.

According to a further, particularly preferred refinement of the invention, a defroster air duct which is coupled to a defroster air supply device and runs along the entire lower windshield edge region below the front instrument panel wall region is provided. This defroster air duct is preferably formed integrally with the individual vent air-feeding duct, but may also be configured as a separate component. Defroster nozzles are formed in the front instrument panel wall region in order to be able to feed the air from the defroster air duct to the windshield. Furthermore, the defroster air duct can be guided in an edge region, as seen in the direction of the transverse axis of the vehicle, away from the windshield, as seen in the direction of the longitudinal axis of the vehicle, to the rear into the rear instrument panel wall region of the individual vent air-feeding duct ending there, in order to defrost side window regions via correspondingly assigned defroster nozzles. As a result, the free space in the region between the individual vent air-feeding duct and the defroster duct can be enclosed at least in some regions as an installation space for the airbag module. In addition, a particularly effective feeding of defroster air to the window regions is possible here with a defroster air duct of this type. Through the use of the construction of the ventilation device according to the invention, in which at least one branch duct starts from the individual vent air-feeding duct in order to supply air to the air passage openings for a diffuse ventilation of the vehicle interior, the defroster air circulation is separated from the individual vent air circulation, so that during the defrosting air is not branched off because of the at least one branch duct.

According to a further, particularly preferred refinement of the invention, the at least one airbag, in the unactivated, collapsed basic state, is arranged behind the front instrument panel wall region, which is assigned to the windshield, as the instrument-panel-side airbag outlet wall region. The airbag outlet opening, which can be formed in the front instrument panel wall region, is at a predeterminable safety distance from a potential head-impact region of a vehicle occupant in the head-impact instrument wall region adjoining the front instrument panel wall region away from the windshield in the direction of the vehicle interior. In this case, the safety distance can be predetermined in such a manner that the airbag, after advancing in the direction of the vehicle interior by a distance corresponding to the safety distance between the airbag outlet opening and the potential head-impact region, has a filling pressure which is reduced in accordance with predeterminable limit values in comparison with the initial filling pressure in the airbag at the beginning of the airbag activation.

With a safety distance of this type between the airbag outlet opening and a potential head-impact region of a vehicle occupant, it is advantageously achieved that, in particular when there are vehicle occupants who are out-of-position in the front passenger region, such as, for example, children standing behind the instrument panel who may, even before the airbag is activated, impact with the head against the head-impact region of the instrument panel or move with their head toward the head-impact region, the risk of the vehicle occupant being injured is considerably reduced, since the airbag emerging through the airbag outlet opening in the front instrument panel wall region has already dissipated a considerable part of its very high initial filling pressure before striking against the vehicle occupant's head, for example, and so the impact of the airbag against the vehicle occupant is much less aggressive. With an increasing safety distance between the airbag outlet opening and the potential head-impact region of the instrument panel, the aggressiveness of the airbag decreases when actually striking against a vehicle occupant, since the filling pressure in the airbag decreases considerably with every centimeter covered, in particular at the beginning of the airbag deployment.

Due to the safety distance, the airbag can therefore, as before, be inflated directly toward the desired inflation region, but the filling pressure in the airbag is dissipated along the safety distance to such an extent, preferably until the desired final filling pressure of the airbag is reached, such that the aggressiveness of the airbag when striking against a vehicle occupant who is out-of-position is reduced as far as possible. Due to the high initial filling pressure, the airbag can very rapidly overcome the safety distance during the inflation process, so that, as a result, there is also no significant delay in the inflation of the airbag in front of a vehicle occupant who is, for example, in a normal sitting position.

According to one particularly preferred refinement, the safety distance is defined in such a manner that, after the airbag has advanced by a distance corresponding to the defined safety distance, the filling pressure in the airbag in the potential head-impact region is at most approximately 15%, preferably at most approximately 10% and most preferably at most approximately 5% of the initial gas pressure. Since the filling pressure in the airbag is a function of the distance covered, the safety distance, according to a further preferred refinement, is to be, for example, at least approximately 10 cm, but preferably at least 15 cm and most preferably at least 20 cm, depending on the particular impact situation. This achieves very good results in respect of the reduced aggressiveness of the airbag. According to one specific embodiment, the airbag has an initial filling pressure of between approximately 30 bar and 35 bar and, after advancing by a distance of approximately 100 mm, the filling pressure is approximately 2.5 to 3.5 bar and, after advancing by a distance of approximately 200 mm, is preferably approximately 1.5 to 2.5 bar. According to one specific embodiment of this type, the airbag has therefore dissipated approximately 90% of its initial filling pressure after being advanced by a distance of approximately 100 mm, and approximately 95% of its initial filling pressure after being advanced by a distance of approximately 200 mm, with the desired filling pressure in the airbag at the end of the inflation process being approximately 1.5 to 2.5 bar. The effect therefore advantageously achieved with a specific construction of this type is that, at a safety distance of approximately 200 mm, the aggressiveness of the airbag is reduced in the maximum possible manner. Even with a safety distance of approximately 100 mm, the aggressiveness of the airbag is reduced here to such an extent that the risk of injury for the vehicle occupants, in particular for children who are out-of-position in the front passenger region, is considerably reduced.

In principle, there are various possibilities for defining the starting and end point of the distance corresponding to the safety distance. For example, it is possible to define the one end point of the safety distance approximately in a central region of the airbag outlet opening which can be formed and also to define the other end point approximately in a central region of the potential head-impact region of the instrument panel. However, the safety distance, as seen in cross section through the instrument panel, is particularly preferably approximately the straight, shortest connection between the start of the potential head-impact region facing the airbag outlet opening and the start of the airbag outlet opening facing the potential head-impact region. This allows to minimize possible inaccuracies from the outset and allows to optimize the construction. In addition, the start of the head-impact region then preferably constitutes here the limit region against which a vehicle occupant's head can impact, depending on the different head impact situations, for example a 3 year old child standing and a 6 year old child seated and not wearing a seat belt, in accordance with predetermined test conditions. This is because, depending on the starting position, the head impact may be situated sometimes to a greater extent and sometimes to a lesser extent in the direction of the front instrument panel region. The safety distance is then preferably measured here from that region of the potential head-impact region which, in all situations, is situated closest to the airbag outlet opening. This substantially increases the functional reliability.

According to a further preferred refinement, provision is made for the airbag housing to be configured in such a manner that the at least one airbag which is accommodated therein, in the fitted basic state, is arranged laterally next to the at least one gas generator. This results in a flat construction of the airbag module that is suitable, in particular, for constricted installation situations.

Furthermore, at least one material weakening and/or predetermined breaking point can be provided in the connecting region between a gas generator housing region accommodating the gas generator and an airbag housing region accommodating the airbag. When force is applied to one of the two housing parts, in particular when force is applied to the gas generator housing region, which protrudes at least in some regions into a deformably configured, potential head-impact region of the instrument panel, the material weakening and/or predetermined breaking point can break and prevent the deformation region from forming a solid barrier. The effect achieved with a construction of this type, in which predetermined breaking points and/or material weakenings are provided, is that a housing subregion situated in a deformation region, as may be the case, in particular, with particularly confined installation conditions, does not obstruct the deformation to a great extent. In this case, the predetermined breaking point and/or material weakening may be configured in such a manner that the gas flow into the airbag is completely suppressed, if this is desired, by, for example, the one housing subregion being blown off. As an alternative to this, however, a material weakening, for example in the form of a plastic deformation, may also be provided permitting, as before, a gas flow into the airbag.

According to another feature of the invention, the individual vent nozzle is provided in an edge region of the instrument panel; and the individual vent air-feeding duct is coupled, in a central region of the instrument panel, as seen in a direction of the transverse axis of the vehicle, to the air supply device and extends from the central region of the instrument panel substantially straight in a direction of the transverse axis of the vehicle to the individual vent nozzle in the edge region of the instrument panel.

According to yet another feature of the invention, the individual vent air-feeding duct is integrally formed with a lower side of the instrument panel or the individual vent air-feeding duct is secured on a lower side of the instrument panel in a substantially air-tight manner via a screw connection, a clip connection and/or a welding connection.

According to a further feature of the invention, the instrument panel has a lower side wall region which serves as part of a duct wall of the individual vent air-feeding duct.

According to another feature of the invention, the branch duct extends from the individual vent air-feeding duct to a region below the air passage openings in the front instrument panel wall region such that the branch duct does not cover the airbag module from above.

According to yet another feature of the invention, the front instrument-panel wall region has a load-bearing basic body; and a discharge nozzle is integrated in the load-bearing basic body of the front instrument panel wall region and is connected to the branch duct.

According to another feature of the invention, a covering covers the load bearing basic body from above; and the covering has perforations formed therein, the perforations form a continuous perforation pattern and serve as air passage openings at the discharge nozzle for setting a diffuse ventilation.

According to a further feature of the invention, a defroster air duct is coupled to a defroster air supply device, the defroster air duct extends below the front instrument-panel wall region substantially along an entire length of a lower edge region of the windshield; and a defroster nozzle is disposed in the front instrument-panel wall region for guiding air from the defroster air duct to the windshield.

According to another feature of the invention, the defroster air duct extends into an edge region of the instrument panel, when viewed in a direction of the transverse axis of the vehicle; the defroster air duct extends, in the edge region of the instrument panel, away from the windshield, when viewed in a direction of the longitudinal axis of the vehicle, and extends rearward into the rear instrument panel wall region where the individual vent air-feeding duct ends; a further defroster nozzle is assigned to the defroster air duct and configured to defrost a side window region; and the defroster air duct and the individual vent air-feeding duct at least partially enclose the free space serving as an installation space for the airbag module.

According to another feature of the invention, at least a portion of the potential head-impact instrument panel wall region of the instrument panel is made from an energy-absorbing material or a deformable material configured to absorb energy when being deformed and/or the instrument panel is formed to provide a deformation space below the potential head-impact instrument panel wall region such that, when a head impacts against a potential head-impact region, the potential head impact region deforms unimpeded into the deformation space with energy being absorbed.

According to yet another feature of the invention, the potential head-impact instrument panel wall region includes a backing layer made of energy-absorbing foam.

According to another feature of the invention, the potential head-impact instrument panel wall region includes an energy-absorbing backing layer and a slush skin covering the energy-absorbing backing layer.

According to a further feature of the invention, the airbag, when in an unactivated, collapsed basic state, is disposed behind the front instrument-panel wall region; the potential head-impact instrument panel wall region has a potential head-impact region for a vehicle occupant; the front instrument panel wall region includes an instrument-panel-side airbag outlet wall region configured to have an airbag outlet opening formed therein; and the airbag outlet opening is provided at a given safety distance from the potential head-impact region, the given safety distance is provided such that the airbag, when having advanced in a direction toward the vehicle interior by a distance corresponding to the given safety distance between the airbag outlet opening and the potential head-impact region, has a filling pressure which is reduced in accordance with given limit values in comparison with an initial filling pressure in the airbag at a beginning of an airbag activation.

According to another feature of the invention, the given safety distance is provided such that, when the airbag has advanced by a distance corresponding to the given safety distance, the filling pressure in the airbag in the potential head-impact region is at most substantially 15% of the initial filling pressure, preferably at most substantially 10% of the initial filling pressure, and most preferably at most substantially 5% of the initial filling pressure.

According to another feature of the invention, depending on a respective impact situation, the given safety distance is at least substantially 10 cm, preferably at least substantially 15 cm, and most preferably at least substantially 20 cm.

According to another feature of the invention, the airbag is configured to have an initial filling pressure of between substantially 30 bar and 35 bar and, when the airbag has advanced by a distance of approximately 100 mm, the airbag has a filling pressure of between substantially 2.5 bar and 3.5 bar, and preferably, when the airbag has advanced by a distance of approximately 200 mm, the airbag has a filling pressure of between substantially 1.5 bar and 2.5 bar.

According to another feature of the invention, the safety distance, as seen in cross section through the instrument panel, is approximately a straight, shortest connection between a start of the potential head-impact region facing the airbag outlet opening and a start of the airbag outlet opening facing the potential head-impact region.

According to a further feature of the invention, the airbag housing is configured such that the airbag, in a fitted basic state, is disposed laterally next to the gas generator, and/or the airbag housing has an airbag housing region for accommodating the airbag and a gas generator housing region for accommodating the gas generator; and the airbag housing has a connecting region between the gas generator housing region and the airbag housing region, the connecting region has a weakened region such as a material weakening or a predetermined breaking point configured such that, when force is applied to the gas generator housing region or the airbag housing region, the weakened region breaks in order to prevent a deformation region of the instrument panel from becoming a solid barrier.

According to another feature of the invention, the gas generator housing region protrudes at least partly into a deformable potential head-impact region of the instrument panel; and when force is applied to the gas generator housing region, the weakened region breaks in order to prevent the deformable potential head-impact region of the instrument panel from becoming a solid barrier.

Other features which are considered as characteristic for the invention are set forth in the appended claims.

Although the invention is illustrated and described herein as embodied in a ventilation device for a vehicle, in particular for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
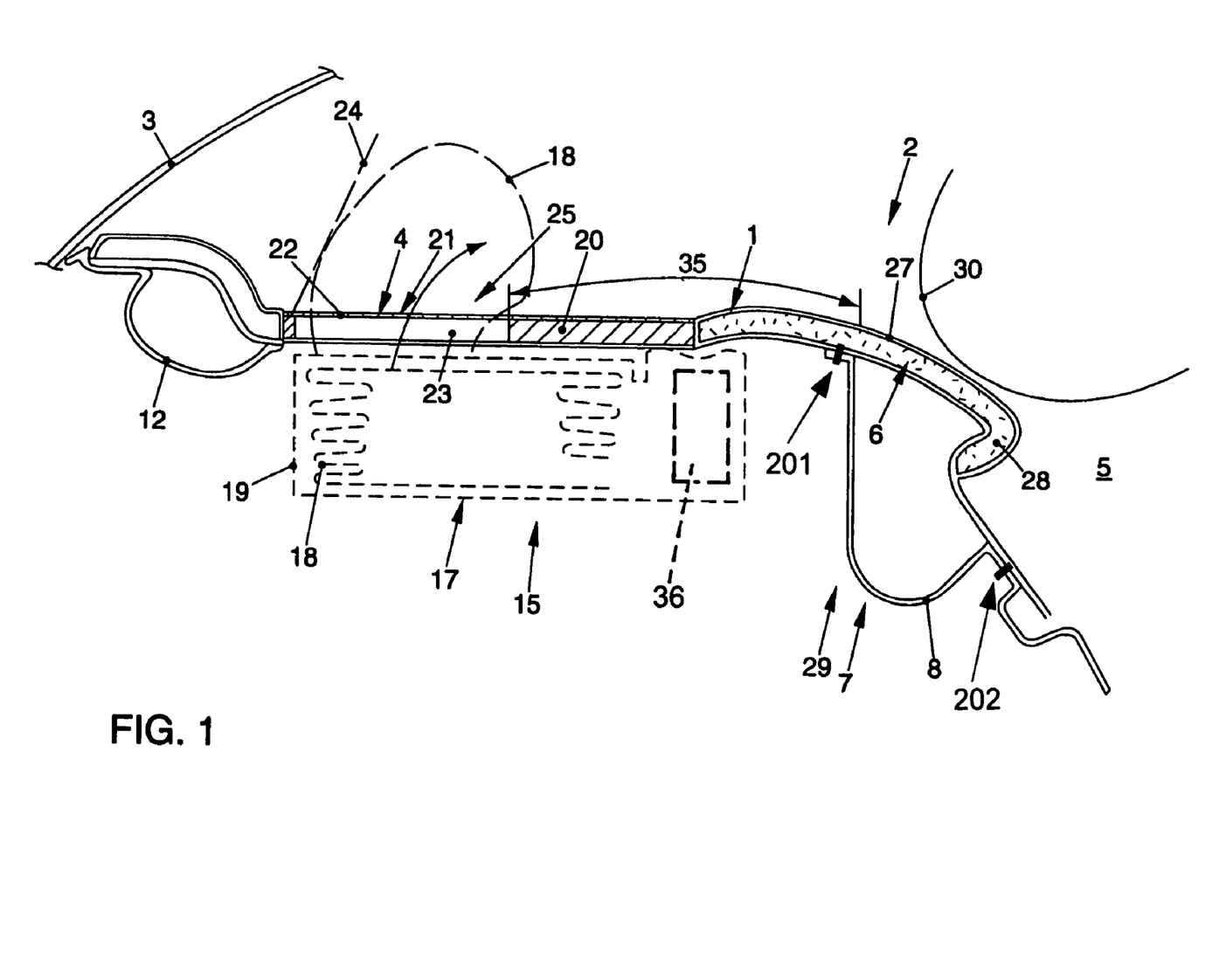
FIG. 1 is a diagrammatic, cross-sectional view of an instrument panel in the front passenger region in accordance with the invention.

Referring now to the figures of the drawings in detail and first, particularly, to FIG. 1 thereof, there is shown a cross section through an instrument panel 1 in the front passenger region 2 of a motor vehicle. The instrument panel 1 has a front instrument panel wall region 4, which is assigned to a windshield 3, and a rear instrument panel wall region 6, as the potential head-impact instrument panel wall region, which region adjoins the front instrument panel wall region 4, when viewed in cross section through the instrument panel, away from the windshield 3 in the direction toward the vehicle interior 5.

A ventilation device 7 according to the invention has an individual vent air-feeding duct 8, which is coupled to an air supply device, for feeding air to individual vent nozzles which are disposed in the instrument panel wall region, the individual vent air-feeding duct 8 being covered by the instrument panel 1. In the exemplary embodiment shown in FIG. 1, the individual vent air-feeding duct 8 is secured on a lower side of the instrument panel via connecting elements 201, 202 which are only schematically indicated and which may be embodied as a screw connection, a clip connection or a welding connection.

The individual vent air-feeding duct 8 runs below the potential head-impact instrument panel wall region 6 in the front passenger region 2 and is coupled, in a central instrument panel region 9 (FIGS. 2, 3) via an air inlet opening 10 to the air supply device and is guided from there approximately straight in the direction of the transverse axis of the vehicle to an individual vent nozzle provided on the edge. A discharge opening 11 of the individual vent air-feeding duct 8 is assigned to an individual vent nozzle.

As can furthermore be gathered from FIGS. 1 to 3, the individual vent air-feeding duct 8 is formed integrally with a defroster air duct 12 which is coupled to a defroster air supply device and runs essentially along the entire lower windshield edge region below the front instrument panel wall region 4. As is illustrated diagrammatically in FIG. 3 by the upwardly directed arrows 13, defroster nozzles 203, which are not illustrated in detail, are formed in the front instrument panel wall region 4, which is assigned to the windshield 3, in order to feed air from the defroster air duct 12 to the windshield 3. The supply of air to the defroster air duct 12 takes place here via a defroster air inlet opening 14.

Figure 2:
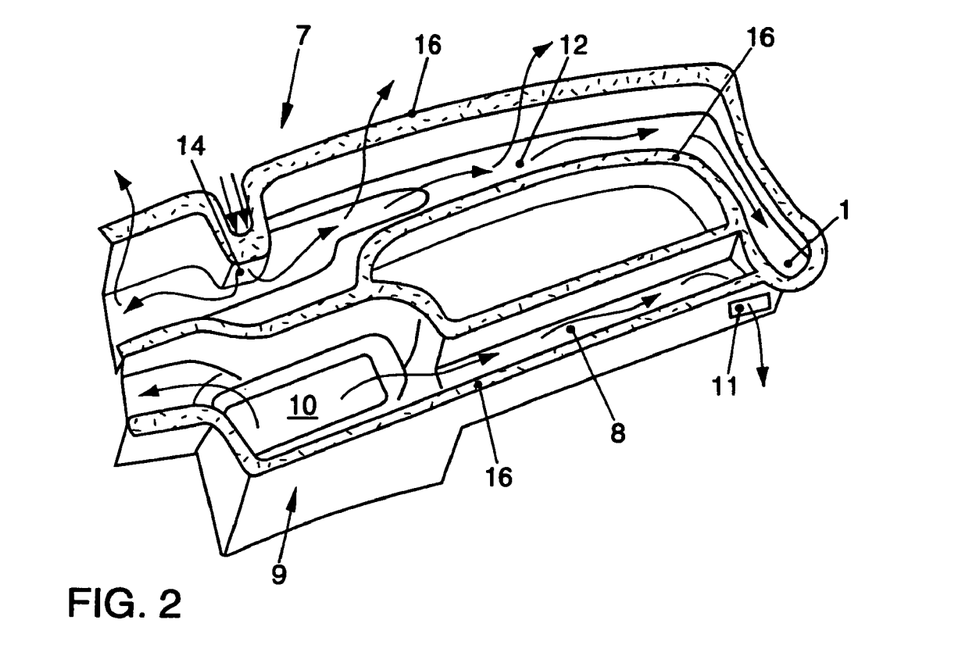
FIG. 2 is a diagrammatic, perspective view of the front passenger region of an individual vent air-feeding duct combined with a defroster air duct in accordance with the invention.
Figure 3:
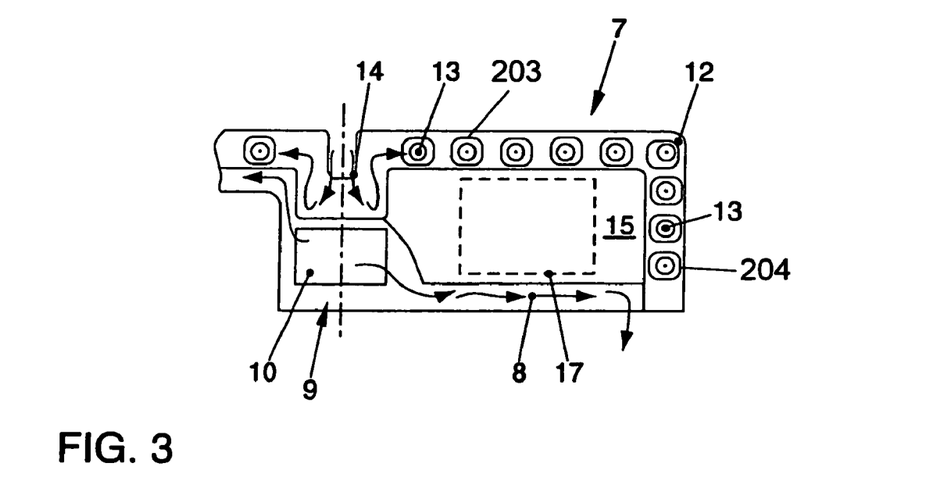
FIG. 3 is a diagrammatic plan view of the front passenger region of an individual vent air-feeding duct combined with a defroster air duct as shown in FIG. 2 in accordance with the invention.

As can furthermore be gathered from FIGS. 2 and 3, the defroster air duct 12 is guided in an edge region, when viewed in the direction of the transverse axis of the vehicle, away from the windshield 3 in the direction of the longitudinal axis of the vehicle to the rear into the rear instrument panel wall region 6 of the individual vent air-feeding duct 8 ending there, in order to defrost side window regions via defroster nozzles 204 which are correspondingly assigned there and are not illustrated here in detail. As a result, as is apparent in particular from FIGS. 2 and 3, a free space 15 in the region between the individual vent air-feeding duct 8 and the defroster air duct 12 is configured as an installation space.

As can furthermore be gathered from FIGS. 1 to 3, both the defroster air duct 12 and the individual vent air-feeding duct 8 in each case have, in a region facing the lower side of the instrument panel, welding connecting surfaces 16 via which the individual vent air-feeding duct 8 and the defroster air duct 12 can be welded to the lower side of the instrument panel, as is illustrated in FIG. 1 in the fitted state. As a result, a lower side wall of the instrument panel 1 in each case forms a wall of the defroster air duct 12 and of the individual vent air-feeding duct 8.

An airbag module 17 can be arranged, as is shown diagrammatically and by dashed lines in FIGS. 1 and 3, in the free space 15, i.e. in front of the individual vent air-feeding duct 8, as seen in the direction of the longitudinal axis of the vehicle, in the front passenger region 2 and therefore outside the potential head-impact instrument panel wall region 6, the airbag module having an airbag 18 (illustrated by dashed lines in FIG. 1) and a gas generator 36 as a filling device, which are accommodated in an airbag housing 19. The airbag housing 19 is secured, for example at least in some regions, on a lower side of the instrument panel indirectly via a firing duct or directly.

Figure 6:
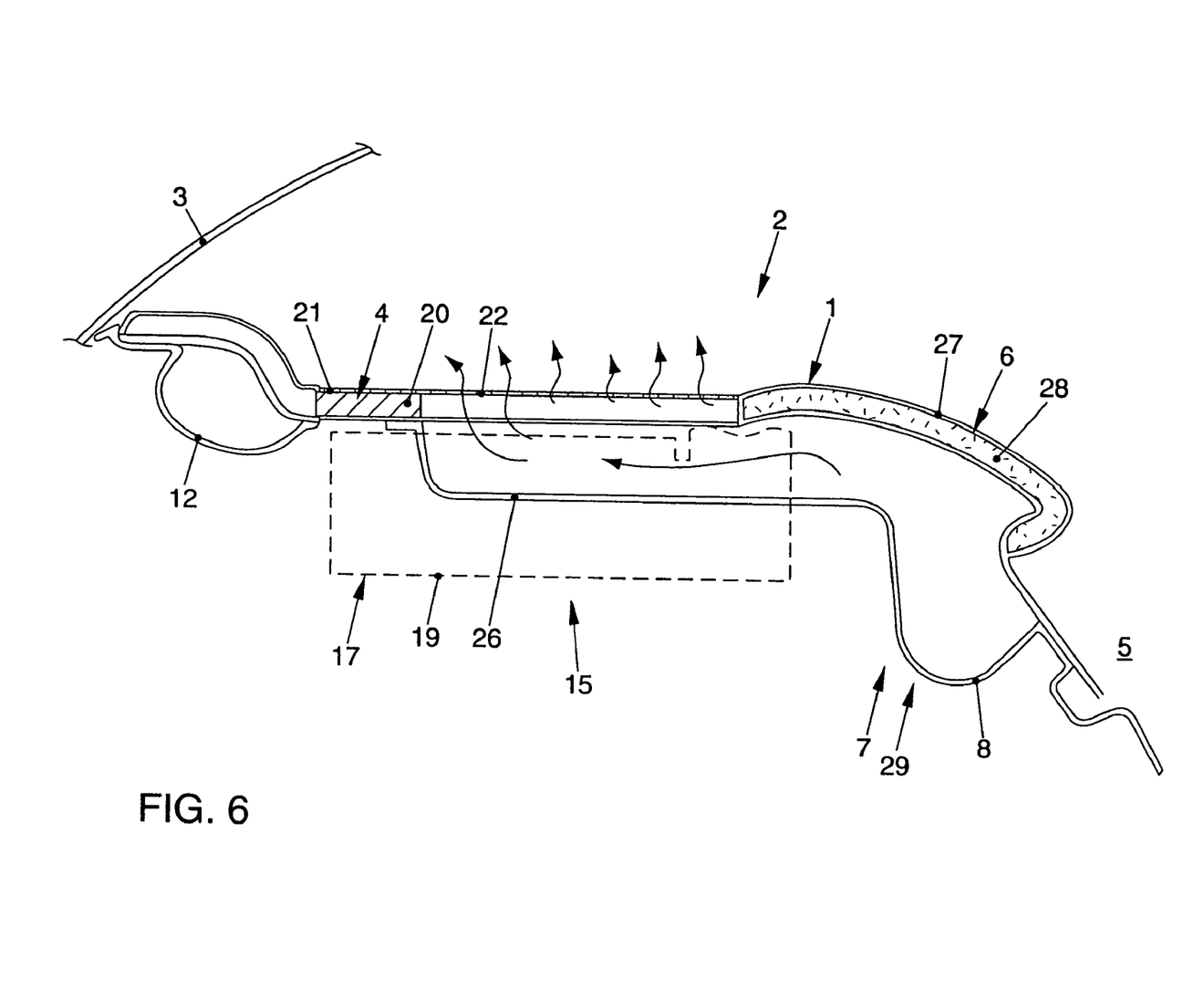
FIG. 6 is a diagrammatic cross-sectional view of an instrument panel in the front passenger region, with the sectional profile extending through a branch duct for a diffuse ventilation in accordance with the invention.

As is apparent in particular from FIGS. 1 and 6, at least the front instrument panel wall region 4, which faces the windshield 3, can be formed from a load-bearing basic body 20 in which at least one discharge nozzle is integrated. The basic body 20 is covered from above with a covering 21 which is continuously perforated with a perforation pattern in such a manner that a diffuse ventilation can be set via the perforations 22 as air passage openings at least in the region of the at least one discharge nozzle. A cutout 23 is provided in the basic body 20, as illustrated in FIG. 1. In addition, the perforated covering 21 is provided in this region with predetermined breaking points in order to form a covering flap 24 (illustrated by dashed lines in FIG. 1) which can be pivoted up and is intended for opening up an airbag outlet opening 25 in the front instrument panel wall region 4, the covering 21 covering the cutout 23 from above in the unactivated state, as illustrated in FIG. 1 and in FIG. 6 by solid lines, to provide a continuous, uniform appearance.

In the event of the airbag activation, the airbag 18 then presses with its high initial filling pressure of, for example, 30 bar against the covering flap 24 in order to open up the airbag outlet opening 25. In order to prevent the covering flap 24, while it is pivoting up, from striking against the windshield 3, a retaining device, such as, for example, an intercepting strap, which restricts the pivoting-up angle of the covering flap 24, can be provided in the region of the airbag outlet opening 25. In addition, a certain inflation direction of the airbag 18 toward the vehicle interior 5 can be predetermined with a certain tilt angle or setting angle of the covering flap 24.

Figure 7:
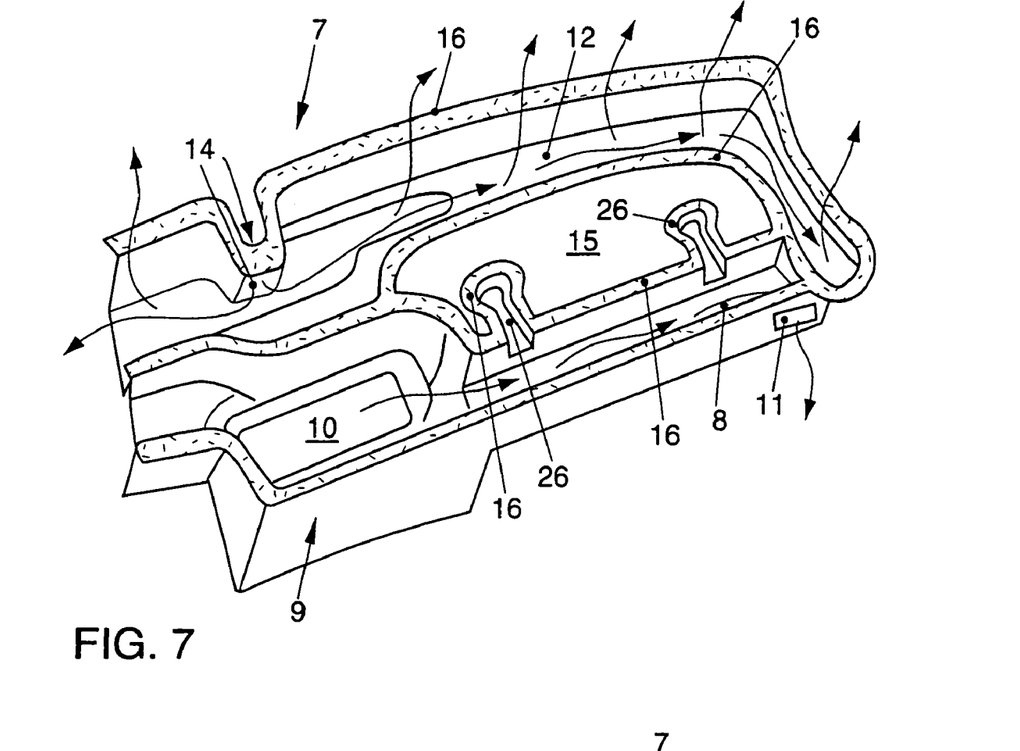
FIG. 7 is a diagrammatic, perspective view of a front passenger's individual vent air-feeding duct with a combined defroster air duct and branch ducts which are illustrated in an exemplary manner, the branch ducts extending away from the individual vent air-feeding duct in accordance with the invention.
Figure 8:
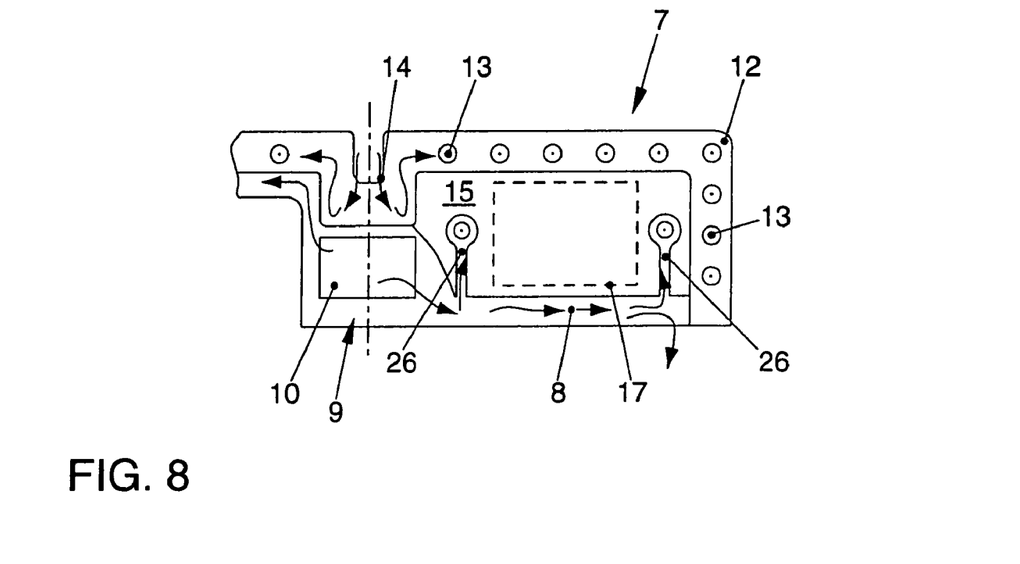
FIG. 8 is a diagrammatic plan view of the front passenger's individual vent air-feeding duct with the combined defroster air duct and branch ducts as shown in FIG. 7 in accordance with the invention.

As can be gathered in particular from FIG. 6 in conjunction with FIGS. 7 and 8, starting from the individual vent air-feeding duct 8, two (by way of example here) branch ducts 26 are guided into the front instrument panel wall region 4 and there into the region below the perforations 22. As is apparent in particular from FIG. 7, the branch ducts 26 are guided in the region of the perforations 22 in the front instrument panel wall region 4 in such a manner that they, as seen from above, do not cover the airbag module 17. With branch ducts 26 of this type, a simple feeding of air to the perforations 22 for the diffuse ventilation of the vehicle interior 5 is provided.

As can be gathered from FIGS. 1, 4, 5 and 6, the potential head-impact region as the rear instrument panel wall region 6 may partially be produced from a material which can be deformed with energy being absorbed, for example from a backing layer 28 of energy-absorbing foam covered by a slush skin 27. In the region situated below the rear instrument panel wall region 6 as the potential head-impact region, a deformation space 29 is formed, into which the potential head-impact region of the instrument panel 1, as illustrated merely diagrammatically and by dashed lines in FIG. 4, can be deformed without obstruction, with energy being absorbed, during an impact by the head 30 of a vehicle occupant.

Figure 4:
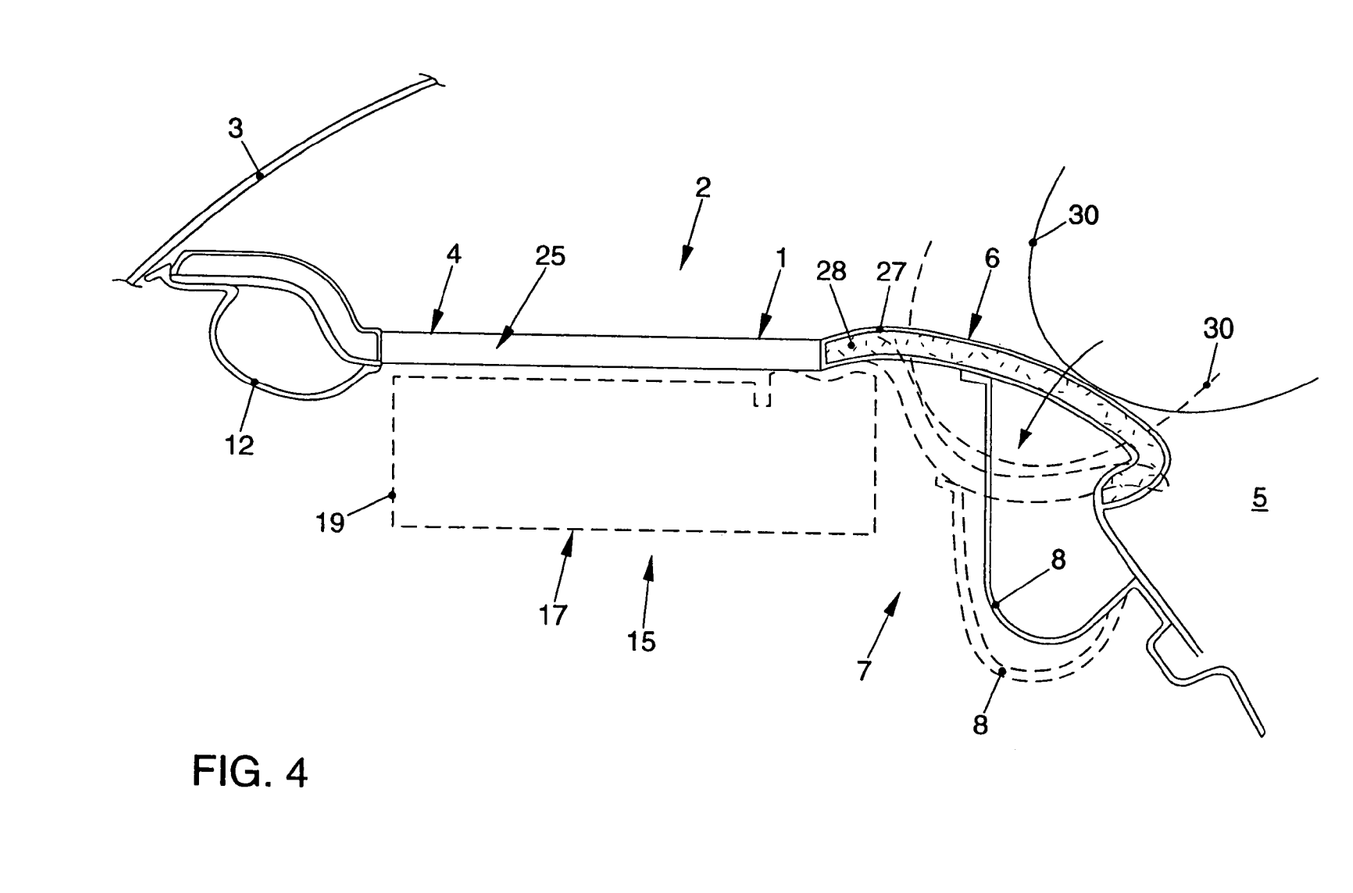
FIG. 4 is a diagrammatic, cross-sectional view of an instrument panel in the front passenger region as shown in FIG. 1 illustrating with dashed lines a potential head impact situation in accordance with the invention.

As can furthermore be gathered from FIG. 4, this deformation of the potential head-impact region into the deformation space 29 is not substantially obstructed by the individual vent air-feeding duct 8, since the individual vent air-feeding duct 8 is generally produced from a plastic material which is not very stiff and can therefore undertake the deformation without causing the deformation region to form a solid barrier.

Figure 5:
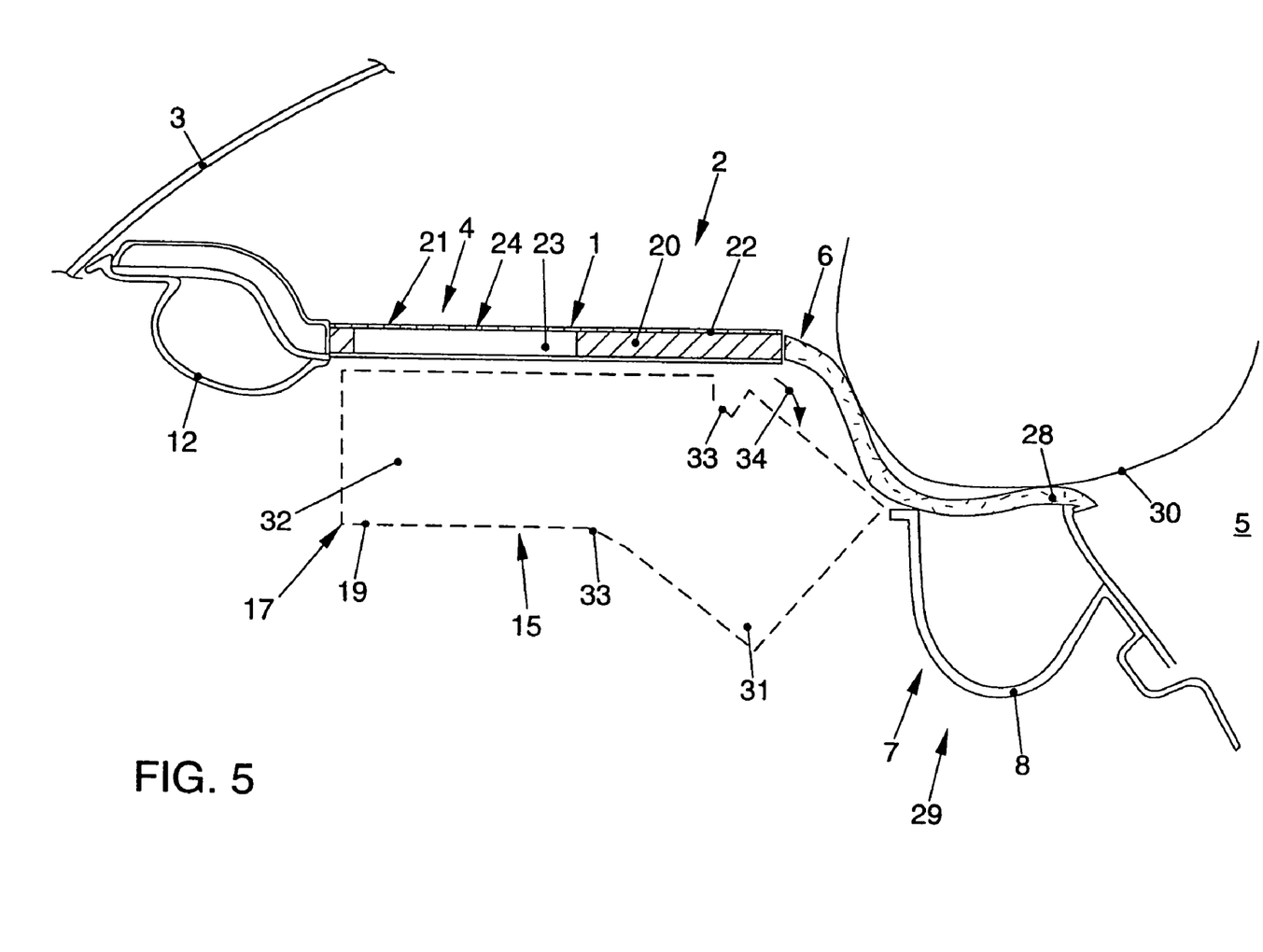
FIG. 5 is a diagrammatic, cross-sectional view of an instrument panel in the front passenger region according to FIG. 1 illustrating with dashed lines an alternative potential head impact situation in accordance with the invention.

In particular for the situation shown in FIG. 5 in which there are confined installation conditions, and at least one subregion of the airbag housing 19, for example a gas generator housing region 31 accommodating a gas generator, protrudes at the edge into the rear instrument panel wall region 6 as the potential head-impact region, provision may be made for this gas generator housing region 31 to be connected, for example via predetermined breaking points 33, to an airbag housing region 32 which accommodates the airbag 18. The effect achieved by this is that, when a force is applied to the deformably configured, potential head-impact region as the rear instrument panel wall region 6, and there is an impact contact of the deformable subregion with the gas generator housing region 31, the gas generator housing region 31 buckles or breaks along the predetermined breaking points 33, as is illustrated merely by dashed lines and by the arrow 34 in the illustration of FIG. 5. This considerably reduces the risk of the deformation region forming a solid barrier.

As is shown merely diagrammatically in FIG. 1, the airbag module 17, and therefore, in particular, the airbag 18, is arranged in the unactivated, collapsed basic state behind the front instrument panel wall region 4, which is assigned to the windshield 3. The airbag outlet opening 25, which can be formed in this front instrument panel wall region 4, is at a predeterminable safety distance 35 from the rear instrument panel wall region 6 as the potential head-impact instrument panel wall region of the head 30 of a vehicle occupant. The safety distance 35 is predetermined here in such a manner that the airbag 18, after having advanced by a distance in the direction of the vehicle interior 5 which corresponds to the safety distance 35 between the airbag outlet opening 25 and the potential head-impact instrument panel wall region 6, has a gas pressure as filling pressure which is reduced in accordance with predetermined limit values in comparison with the initial gas pressure in the airbag 18 at the beginning of the airbag activation. As is illustrated merely by way of example and diagrammatically in FIG. 1, the safety distance 35, as seen in cross section, is preferably approximately the straight, shortest connection between the particularly critical and potential head-impact region and the start or periphery of the airbag outlet opening 25.

The high initial filling pressure of approximately 30 bar is already reduced to a pressure of approximately 3 bar in particular in the first centimeters, i.e. in particular after the airbag has advanced by a distance of approximately 100 mm. Approximately from an advancing distance of 120 mm on, a pressure for example of approximately 2 bar is obtained in the airbag, the pressure corresponding to the minimum pressure present in the airbag at the end of the inflation process. That is to say, the airbag aggressiveness which is present because of the filling process and the high filling pressure associated therewith is already considerably reduced at a safety distance of approximately 120 mm. As a result, depending on the given installation conditions, a considerable reduction in the risk of injury for vehicle occupants, such as children, who are out-of-position can already be obtained, for example, from a safety distance of approximately 100 mm between the airbag outlet opening 25 and the head-impact region, since the aggressiveness of the airbag 18, which is caused by the high initial filling pressure, is reduced virtually to the minimum value after passing through the safety distance 35.

We claim:

1. In a vehicle having a windshield, a ventilation device, comprising:
    an instrument panel having a front passenger region with a front instrument-panel wall region and a rear instrument-panel wall region, said front instrument-panel wall region being assigned to the windshield, said rear instrument-panel wall region, when viewed in cross section through said instrument panel, adjoining said front instrument panel wall region in a direction away from the windshield and toward a vehicle interior, said rear instrument-panel wall region serving as a potential head-impact instrument panel wall region for a front passenger;
    an individual vent nozzle provided at said instrument panel;
    an individual vent air-feeding duct for feeding air to said individual vent nozzle, said individual vent air-feeding duct being covered by said instrument panel;
    an air supply device coupled to said individual vent air-feeding duct;
    an airbag module including an airbag housing, an airbag, and a gas generator, said airbag and said gas generator being accommodated in said airbag housing, said airbag module, when in a mounted state, being covered by said instrument panel;
    said individual vent air-feeding duct extending below said potential head-impact instrument panel wall region substantially in a direction of a transverse axis of the vehicle;
    said front passenger region being configured such that a free space is provided in front of said individual vent air-feeding duct when viewed along a longitudinal axis of the vehicle, said airbag module being disposed in the free space in front of said individual vent air-feeding duct such that said airbag module is assigned to said front instrument panel wall region and is substantially outside said potential head-impact instrument panel wall region;
    said front instrument-panel wall region facing the windshield having a region with air passage openings formed therein for a diffuse ventilation of the vehicle interior; and
    a branch duct extending from said individual vent air-feeding duct to a region below said air passage openings.

2. The ventilation device according to claim 1, wherein:
    said individual vent nozzle is provided in an edge region of said instrument panel; and
    said individual vent air-feeding duct is coupled, in a central region of said instrument panel, as seen in a direction of the transverse axis of the vehicle, to said air supply device and extends from said central region of said instrument panel substantially straight in a direction of the transverse axis of the vehicle to said individual vent nozzle in said edge region of said instrument panel.

3. The ventilation device according to claim 1, wherein said individual vent air-feeding duct is formed integral with a lower side of said instrument panel.

4. The ventilation device according to claim 1, wherein said individual vent air-feeding duct is secured on a lower side of said instrument panel in a substantially air-tight manner via at least one connecting element selected from the group consisting of a screw connection, a clip connection and a welding connection.

5. The ventilation device according to claim 1, wherein said instrument panel has a lower side wall region serving as part of a duct wall for said individual vent air-feeding duct.

6. The ventilation device according to claim 1, wherein said branch duct extends from said individual vent air-feeding duct to a region below said air passage openings in said front instrument panel wall region such that said branch duct does not cover said airbag module from above.

7. The ventilation device according to claim 1, wherein:
    said front instrument-panel wall region has a load-hearing basic body; and
    a discharge nozzle is integrated in said load-bearing basic body of said front instrument panel wall region and is connected to said branch duct.

8. The ventilation device according to claim 7, including:
    a covering for covering said load bearing basic body from above; and
    said covering having perforations formed therein, said perforations forming a continuous perforation pattern and serving as air passage openings at said discharge nozzle for setting a diffuse ventilation.

9. The ventilation device according to claim 1, including:
    a defroster air supply device;
    a defroster air duct coupled to said defroster air supply device, said defroster air duct extending below said front instrument-panel wall region substantially along an entire length of a lower edge region of the windshield; and
    a defroster nozzle disposed in said front instrument-panel wall region for guiding air from said defroster air duct to the windshield.

10. The ventilation device according to claim 9, wherein:
    said defroster air duct extends into an edge region of said instrument panel, when viewed in a direction of the transverse axis of the vehicle;
    said defroster air duct extends, in said edge region of said instrument panel, away from the windshield, when viewed in a direction of the longitudinal axis of the vehicle, and extends rearward into said rear instrument panel wall region where said individual vent air-feeding duct ends;
    a further defroster nozzle is assigned to said defroster air duct and configured to defrost a side window region; and
    said defroster air duct and said individual vent air-feeding duct at least partially enclose the free space serving as an installation space for said airbag module.

11. The ventilation device according to claim 1, wherein at least a portion of said potential head-impact instrument panel wall region of said instrument panel is made from an energy-absorbing material.

12. The ventilation device according to claim 1, wherein:
said potential head-impact instrument panel wall region is made from a deformable material configured to absorb energy when being deformed; and
said instrument panel is formed to provide a deformation space below said potential head-impact instrument panel wall region such that, when a head impacts against a potential head-impact region, said potential head impact region deforms unimpeded into the deformation space with energy being absorbed.

13. The ventilation device according to claim 1, wherein said potential head-impact instrument panel wall region includes a backing layer made of energy-absorbing foam.

14. The ventilation device according to claim 1, wherein said potential head-impact instrument panel wall region includes an energy-absorbing backing layer and a slush skin covering said energy-absorbing backing layer.

15. The ventilation device according to claim 1, wherein:
said airbag, when in an unactivated, collapsed basic state, is disposed behind said front instrument-panel wall region;
said potential head-impact instrument panel wall region has a potential head-impact region for a vehicle occupant;
said front instrument-panel wall region includes an instrument-panel-side airbag outlet wall region configured to have an airbag outlet opening formed therein;
said airbag outlet opening is provided at a given safety distance from said potential head-impact region, the given safety distance is provided such that said airbag, when having advanced in a direction toward the vehicle interior by a distance corresponding to the given safety distance between said airbag outlet opening and said potential head-impact region, has a filling pressure which is reduced in accordance with given limit values in comparison with an initial filling pressure in said airbag at a beginning of an airbag activation.

16. The ventilation device according to claim 15, wherein the given safety distance is provided such that, when the airbag has advanced by a distance corresponding to the given safety distance, the filling pressure in said airbag in said potential head-impact region is at most substantially 15% of the initial filling pressure.

17. The ventilation device according to claim 15, wherein the given safety distance is provided such that, when the airbag has advanced by a distance corresponding to the given safety distance, the filling pressure in said airbag in said potential head-impact region is at most substantially 10% of the initial filling pressure.

18. The ventilation device according to claim 15, wherein the given safety distance is provided such that, when the airbag has advanced by a distance corresponding to the given safety distance, the filling pressure in said airbag in said potential head-impact region is at most substantially 5% of the initial filling pressure.

19. The ventilation device according to claim 15, wherein, depending on a respective impact situation, the given safety distance is at least substantially 10 cm.

20. The ventilation device according to claim 15, wherein, depending on a respective impact situation, the given safety distance is at least substantially 15 cm.

21. The ventilation device according to claim 15, wherein, depending on a respective impact situation, the given safety distance is at least substantially 20 cm.

22. The ventilation device according to claim 15, wherein said airbag is configured to have an initial filling pressure of between substantially 30 bar and 35 bar and, when said airbag has advanced by a distance of substantially 100 mm, said airbag has a filling pressure of between substantially 2.5 bar and 3.5 bar.

23. The ventilation device according to claim 15, wherein said airbag is configured to have an initial filling pressure of between substantially 30 bar and 35 bar and, when said airbag has advanced by a distance of substantially 100 mm, said airbag has a filling pressure of between substantially 2.5 bar and 3.5 bar and, when said airbag has advanced by a distance of substantially 200 mm, said airbag has a filling pressure of between substantially 1.5 bar and 2.5 bar.

24. The ventilation device according to claim 15, wherein the safety distance, as seen in cross section through said instrument panel, is substantially a straight, shortest connection between a start of said potential head-impact region facing said airbag outlet opening and a start of said airbag outlet opening facing said potential head-impact region.

25. The ventilation device according to claim 1, wherein said airbag housing is configured such that said airbag, in a fitted basic state, is disposed laterally next to said gas generator.

26. The ventilation device according to claim 1, wherein:
said airbag housing has an airbag housing region for accommodating said airbag and a gas generator housing region for accommodating said gas generator; and
said airbag housing has a connecting region between said gas generator housing region and said airbag housing region, said connecting region has a weakened region selected from the group consisting of a material weakening and a predetermined breaking point configured such that, when force is applied to said gas generator housing region or said airbag housing region, said weakened region breaks in order to prevent a deformation region of said instrument panel from becoming a solid barrier.

27. The ventilation device according to claim 1, wherein:
said airbag housing has an airbag housing region for accommodating said airbag and a gas generator housing region for accommodating said gas generator, said gas generator housing region protrudes at least partly into a deformable potential head-impact region of said instrument panel; and
said airbag housing has a connecting region between said gas generator housing region and said airbag housing region, said connecting region has a weakened region selected from the group consisting of a material weakening and a predetermined breaking point configured such that, when force is applied to said gas generator housing region, said weakened region breaks in order to prevent said deformable potential head-impact region of said instrument panel from becoming a solid barrier.

28. The ventilation device according to claim 1, wherein said instrument panel is a motor vehicle instrument panel.

* * * * *